United States Patent [19]

Campbell

[11] Patent Number: 5,124,410

[45] Date of Patent: Jun. 23, 1992

[54] REACTIVE GRAFT POLYMERS

[75] Inventor: John R. Campbell, Clifton Park, N.Y.

[73] Assignee: General Electric Company, Schenectady, N.Y.

[21] Appl. No.: 554,505

[22] Filed: Jul. 19, 1990

Related U.S. Application Data

[60] Division of Ser. No. 473,127, Feb. 1, 1990, abandoned, which is a continuation of Ser. No. 188,829, May 2, 1988, abandoned.

[51] Int. Cl.$^5$ ............................................ C08F 255/02
[52] U.S. Cl. ...................................... 525/293; 525/68; 525/302; 525/905
[58] Field of Search ...................... 525/393, 292, 302

[56] References Cited

U.S. PATENT DOCUMENTS 3,458,597 7/1969 Jabloner .
4,499,237 2/1985 Tacke et al. .

Primary Examiner—Jacob Ziegler
Attorney, Agent, or Firm—William H. Pittman; James C. Davis, Jr.

[57] ABSTRACT

Graft polymers are prepared by the free radical reaction of a base polymer such as polyethylene or polypropylene with an olefinic compound containing a tertiary alkyl ester group, which may be a simple carboxylic acid or a carbamic acid ester group. Upon melt blending or the like with polymers containing other functional groups, such as carboxy- or epoxy-functionalized polyphenylene ethers, the t-butyl groups are removed by thermal degradation and there are obtained copolymers which are useful to compatibilize blends of the corresponding polymeric constituents.

11 Claims, No Drawings

REACTIVE GRAFT POLYMERS

This application is a division of copending application Ser. No. 07/473,127, filed Feb. 1, 1990, which is a continuation of application Ser. No. 07/188,829, filed May 2, 1988, both now abandoned.

This invention relates to graft polymers, and more particularly to polymers containing protected groups capable of being converted to reactive functional groups at high temperature.

Blends of polymers derived from olefinically unsaturated monomers with other polymers frequently have advantageous properties as compared with the individual polymeric constituents. For example, polyphenylene ethers are known for their high temperature resistance, high melt viscosities and toughness. However, they are somewhat deficient for many uses in such properties as solvent resistance, impact strength and workability.

Such properties of polyphenylene ethers could be improved by blending them with such materials as olefin polymers. Blends of this type are disclosed, for example, in U.S. Pat. Nos. 4,166,055, 4,383,082 and 4,584,334. It is generally required that such blends contain relatively low proportions of olefin polymer, since in higher proportions they become incompatible with the polyphenylene ether and parts molded therefrom are brittle and may undergo delamination.

It is also known that blends of otherwise incompatible polymers may frequently be made compatible by incorporating therein a copolymer of the constituents of the blend. Copolymer-containing polyphenylene ether compositions of this general type are disclosed, for example, in U.S. Pat. No. 4,600,741 (carboxy-substituted polyphenylene ethers and polyamides) and in PCT application 87/7279 and copending, commonly owned application Ser. No. 122,480, filed Nov. 10, 1987, now U.S. Pat. No. 5,015,698 (carboxy- and epoxy-substituted polyphenylene ethers and polyesters) the disclosures of which are incorporated by reference herein. Copolymer formation generally requires the presence on both polymers of interreactive groups such as carboxylic acid, epoxy and/or amide groups, which may be provided in the case of polyphenylene ethers by reaction with one or more suitable reagents such as trimellitic anhydride acid chloride or terephthaloyl chloride followed by glycidol.

Olefin polymers containing, for example, carboxylic acid moieties, which are capable of reaction with epoxy-functionalized polyphenylene ethers and the like, are known in the art. They are generally copolymers of such olefins as ethylene or propylene with acidic monomers such as acrylic or methacrylic acid. However, the proportion of acidic groups therein is often much too high for effective copolymer formation with retention of the properties of the olefin polymers. Moreover, olefin polymers containing, for example, amino groups which can react with carboxylic acid groups on other polymers are, for the most part, unavailable since unsaturated amines "trap" free radicals formed by the action of radical initiators, acting as chain terminators for the polymerization reaction.

The present invention provides a novel class of graft polymers derived from addition polymers of olefinically unsaturated monomers and containing protected amine or carboxy moieties. Said moieties are capable of conversion at high temperatures to free amino or carboxy groups, which are in turn capable of undergoing reaction with reactive groups on other polymers, facilitating copolymer formation.

The invention includes graft polymers comprising molecules having:

a base polymer chain consisting essentially of structural units derived from an olefinically unsaturated hydrocarbon which is unsubstituted or contains substantially non-reactive substituents, and grafted moieties thereon having the formula

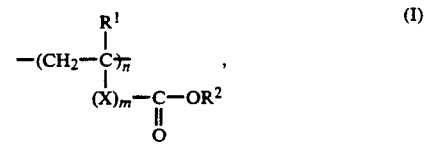

wherein:

X is —NH—, an alkylene radical containing about 1–4 carbon atoms or an arylene radical containing about 6–10 carbon atoms;

$R^1$ is hydrogen, halogen, an alkyl radical containing about 1–4 carbon atoms or an aryl radical containing about 6–10 carbon atoms;

$R^2$ is a tertiary alkyl radical containing about 4–10 carbon atoms;

m is 0 or 1; and n has an average value from 1 to about 5.

The base chains in the graft polymers of this invention are conventionally derived from such monomers as ethylene, propylene, isobutene, sytrene, butadiene, isoprene, chloroprene, vinyl chloride or vinylidene chloride. They may be homopolymers or copolymers, amorphous or crystalline. Polyethylene and polypropylene homopolymers, the former including high density, low density and linear low density polyethylene, are often preferred.

The grafted moieties have formula I. In that formula, $R^1$ may be hydrogen, halogen, alkyl or aryl as defined hereinabove and is most often hydrogen or methyl. $R^2$ is a tertiary alkyl group as described and is most often t-butyl.

Included are polymers in which m is 0 or 1; that is, the X value may be present or absent. When present, it may be an —NH— group or an alkylene or arylene radical as defined. In the preferred graft copolymers, m is 0 or m is 1 and X is —NH—.

The average value of n is from 1 to about 5. It is usually about 1–2, with a value of about 1 being preferred.

The graft polymers of this invention may be prepared by free radical addition of a corresponding olefinic compound to a polymer corresponding to the base polymer chain. Such addition may take place under any suitable conditions for free radical reactions of this type. Thus, bulk or solution addition reactions are acceptable. It is frequently advantageous to conduct the reaction in the melt, in conventional melt reaction equipment such as an extruder.

Any suitable temperature for a free radical addition reaction up to about 225° C. may be employed. Above about 200° C., the maximum reaction time should be about 5 minutes since longer times may cause some degree of thermal degradation of the product. Thermal degradation predominates at temperatures above about 225° C. The preferred reaction temperature is in the range of about 150°–200° C.

It is generally advantageous to employ a free radical initiator in the preparation of the graft polymers of the invention. Any initiator which will generate free radicals at the reaction temperatures employed may be used. Suitable initiators are known in the art; they include dicumyl peroxide, 2,5-dimethyl-2,5-bis(t-butylperoxy)hexane and 2,5-dimethyl-2,5-bis(t-butylperoxy)-3-hexyne.

The proportion of olefinic reactant used will depend on the intended purpose of the graft polymer and the degree of functionalization desired. In general, said proportion is up to about 5% and preferably about 2-3% by weight of the base polymer, whereupon the graft copolymer is functionalized in about the same proportion.

The preparation of graft polymers of this invention is illustrated by the following examples. All parts and percentages are by weight.

EXAMPLE 1-4

Dry blends of a commercially available linear low density polyethylene and a free radical initiator were extruded on a single-screw extruder at 175° C. and 400 rpm., as t-butyl methacrylate was introduced by syringe pump into the extruder throat to provide 3% thereof by weight based on polyethylene. The extrudates were analyzed by Fourier transform infrared spectroscopy, dissolved in xylene, reprecipitated and again analyzed to determine the degree of grafting.

The results are given in Table I. Initiator percentages are based on polyethylene. The initiators are identified as follows:

"Hexane"—2,5-dimethyl-2,5-bis(t-butylperoxy)hexane.

"Hexyne"—2,5-dimethyl-2,5-bis(t-butylperoxy)-3-hexyne.

TABLE I

| Example | Initiator Identity | % | % grafting |
|---|---|---|---|
| 1 | Hexyne | 0.1 | 30 |
| 2 | Hexyne | 0.2 | 50 |
| 3 | Hexyne | 0.3 | 65 |
| 4 | Hexane | 0.3 | 50 |

EXAMPLES 5-8

Dry blends of the polyethylene of Example 1, radical initiator and t-butyl allylcarbamate were extruded, analyzed and reprecipitated as described in Example 1 and in the same proportions. The results are given in Table II.

TABLE II

| Example | Initiator Identity | % | % grafting |
|---|---|---|---|
| 5 | Hexyne | 0.1 | 36 |
| 6 | Hexyne | 0.2 | 52 |
| 7 | Hexyne | 0.3 | 70 |
| 8 | Hexane | 0.3 | 50 |

Infrared spectroscopic analysis of the product of Example 7 showed the presence of a pronounced ester carbonyl peak at 1725 cm.$^{-1}$. Upon heating to 230° C. and pressing a film of the heated product for 5 minutes at 250° C., a thermally degraded polymer containing no ester carbonyl peak was obtained.

The graft polymers of this invention undergo thermal degradation at relatively high temperatures, with the elimination of olefin and, when X is —NH—, carbon dioxide, to yield carboxy- or amino-substituted polymers. The latter are capable of reaction with other polymers containing various functional groups. In particular, they react with functionalized polyphenylene ethers to form polyphenylene ether-polyolefin copolymers, which are in turn useful as compatibilizers for blends of polyphenylene ethers and olefin polymers.

The polyphenylene ethers are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

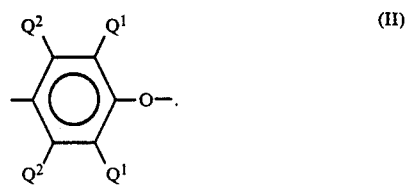

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen and each $Q^2$ is independently hydrogen, halogen, priatoms; mary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

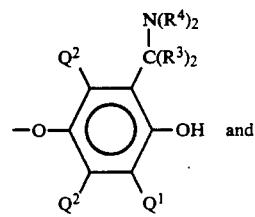 (III)

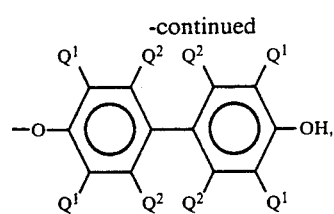 (IV)

wherein $Q^1$ and $Q^2$ are as previously defined; each $R^3$ is independently hydrogen or alkyl, with the proviso that the total number of carbon atoms in both $R^3$ radicals is 6 or less; and each $R^4$ is independently hydrogen or a $C_{1-6}$ primary alkyl radical. Preferably, each $R^3$ is hydrogen and each $R^4$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

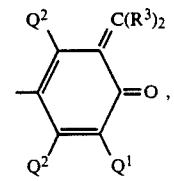

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

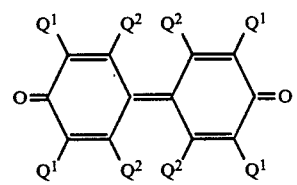 (VI)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in combination with the graft polymers of the present invention include all those presently known, irrespective of variations in structural units or ancillary chemical features.

To prepare the graft polymer-polyphenylene ether copolymer, the former is caused to react with a polyphenylene ether containing functional groups which are capable of reacting with the carboxy or amino groups formed by thermal degradation, as described hereinabove, of the

moieties of said graft copolymer. Epoxy and carboxy groups are illustrative. This reaction may take place in solution or in the melt, at temperatures typically in the range of about 225°–350° C. Melt reactions, especially under extrusion conditions similar except for temperature to those previously described, are often preferred.

By reason of the difference in temperatures required for graft polymer formation and copolymer formation, it is possible to perform both operations sequentially in a single extruder if the proper temperature gradient is maintained. Thus, it is within the scope of the invention to maintain the first zones of the extruder at a temperature up to about 225° C. and feed thereto the base polymer and olefinic compound, to introduce the second functionalized polymer (e.g., the polyphenylene ether) through a downstream port and to maintain a higher temperature, typically about 225°–350° C., in the zones following said downstream port.

The preparation of polyphenylene ether-polyolefin copolymers from the graft polymers of this invention is illustrated by the following examples.

EXAMPLE 9

To a solution in 3 liters of toluene of 325 grams of a poly-(2,6-dimethyl-1,4-phenylene ether) having a number average molecular weight of about 20,000 and an intrinsic viscosity (IV) in chloroform at 25° C. of 0.48 dl./g. is added a solution of 16.53 grams (81.4 mmol.) of terephthaloyl chloride in 250 ml. of toluene. The mixture is stirred for 16 hours, after which 16.7 grams (165 mmol.) of triethylamine is added. Stirring is continued for 4 hours, after which 15.3 grams (207 mmol.) of glycidol is added and stirring is continued for 3 days. The product is precipitated by addition of methanol, redissolved in toluene and reprecipitated, and dried under reduced pressure. It is shown by infrared spectroscopy to be the desired epoxide-functionalized polyphenylene ether.

A five-gram sample of the product of Example 7 is dissolved in xylene, reprecipitated by pouring into methanol and isolated by filtration. A solution of said product and 5 grams of the epoxide-functionalized polyphenylene ether in 200 ml. of 1,2,4-trichlorobenzene is heated for 3 hours at 200°–220° C., cooled and poured into methanol to precipitate the polymeric material. The precipitate is removed by filtration, vacuum dried and exhaustedly extracted with chloroform in a Soxhlet extractor to remove unreacted epoxide-functionalized polyphenylene ether. The residue, comprising copolymer and any unreacted graft polymer, comprises about 28% of total polymer.

EXAMPLE 10

Following the procedure of Example 7, a copolymer is prepared by reaction of the functionalized polyphenylene ether with the product of Example 3. The residue comprises about 25–30% of total polymeric product.

What is claimed is:

1. A graft polymer comprising molecules having:
   a base polymer chain consisting essentially of structural units derived from an olefinically unsaturated hydrocarbon which is unsubstituted or contains substantially non-reactive substituents, and
   grafted moieties thereon having the formula

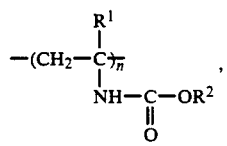

wherein:
   $R^1$ is hydrogen, halogen, an alkyl radical containing about 1–4 carbon atoms or an aryl radical containing about 6–10 carbon atoms;
   $R^2$ is a tertiary alkyl radical containing about 4–10 carbon atoms;
   n has an average value from 1 to about 5.

2. A graft polymer according to claim 1 wherein the base chain is a polyethylene or polypropylene homopolymer chain.

3. A graft polymer according to claim 2 wherein the grafted moieties comprise up to about 5% by weight of the graft polymer.

4. A graft polymer according to claim 3 wherein the average value of n is about 1–2.

5. A graft polymer according to claim 4 wherein $R^1$ is hydrogen or methyl.

6. A graft polymer according to claim 5 wherein $R^2$ is t-butyl.

7. A graft polymer according to claim 6 wherein the base chain is a polyethylene chain.

8. A graft polymer according to claim 7 wherein the grafted moieties comprise about 2–3% by weight of the graft polymer.

9. A graft polymer according to claim 7 wherein the average value of n is about 1.

10. A graft polymer according to claim 7 wherein $R^1$ is hydrogen.

11. A graft polymer according to claim 7 wherein $R^1$ is methyl.

* * * * *